US009531044B2

(12) United States Patent
Engel et al.

(10) Patent No.: US 9,531,044 B2
(45) Date of Patent: Dec. 27, 2016

(54) BATTERY HAVING REDUCED CONDENSATE FORMATION DUE TO WATER SEPARATION

(75) Inventors: Florian Engel, München (DE); Michael Gless, Stuttgart-Zazenhausen (DE); Conrad Bubeck, Esslingen (DE); Andreas Ruehle, Stuttgart (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 925 days.

(21) Appl. No.: 13/822,790

(22) PCT Filed: Aug. 9, 2011

(86) PCT No.: PCT/EP2011/063672
§ 371 (c)(1),
(2), (4) Date: Jul. 22, 2013

(87) PCT Pub. No.: WO2012/034790
PCT Pub. Date: Mar. 22, 2012

(65) Prior Publication Data
US 2013/0295423 A1    Nov. 7, 2013

(30) Foreign Application Priority Data
Sep. 14, 2010 (DE) .................. 10 2010 040 740

(51) Int. Cl.
*H01M 10/50* (2006.01)
*H01M 10/6568* (2014.01)
(Continued)

(52) U.S. Cl.
CPC ....... *H01M 10/5077* (2013.01); *H01M 2/1252* (2013.01); *H01M 10/613* (2015.04); *H01M 10/625* (2015.04); *H01M 10/6568* (2015.04)

(58) Field of Classification Search
CPC .... H01M 10/60; H01M 10/61; H01M 10/613; H01M 10/615; H01M 10/625; H01M 10/65; H01M 10/655; H01M 10/6566; H01M 10/6567; H01M 10/6568; H01M 10/6569; H01M 10/66; H01M 10/617; H01M 2/1252
See application file for complete search history.

(56) References Cited

U.S. PATENT DOCUMENTS

| 6,304,444 B1 * | 10/2001 | Combs ................. H05K 7/2059 |
| | | 165/80.3 |
| 2003/0082438 A1 * | 5/2003 | Kwon ..................... B60R 16/04 |
| | | 429/120 |
| 2007/0236177 A1 | 10/2007 | Phillips et al. |

FOREIGN PATENT DOCUMENTS

| CN | 101595593 A | 12/2009 | |
| DE | 198 48 446 C1 * | 4/2000 | .............. H01M 2/02 |
| (Continued) | | | |

OTHER PUBLICATIONS

Federal Register, vol. 76, No. 27 issued Feb. 9, 2011 which details Supplementary Examination Guidelines for Determining Compliance with 35 U.S.C. 112 and for Treatment of Related Issues in Patent Applications, pp. 7162-7175.*
(Continued)

*Primary Examiner* — Ula C Ruddock
*Assistant Examiner* — Amanda Barrow
(74) *Attorney, Agent, or Firm* — Maginot, Moore & Beck LLP

(57) ABSTRACT

A battery includes an essentially airtight housing having an air-permeable opening for pressure compensation. The battery also includes a plurality of battery cells arranged in the housing. The battery also includes an active cooling device configured to cool the battery cells in the housing. The cooling device includes a coolant and a distributor block
(Continued)

configured to distribute the coolant. The battery also includes an air duct integrated in the distributor block. The air duct is configured and arranged such that the air-permeable opening of the housing is connected to ambient air via the air duct.

13 Claims, 2 Drawing Sheets

(51) Int. Cl.
  *H01M 2/12* (2006.01)
  *H01M 10/625* (2014.01)
  *H01M 10/613* (2014.01)

(56) References Cited

FOREIGN PATENT DOCUMENTS

| DE | 10 2007 011 026 A1 | * | 9/2008 | ............ H01M 10/50 |
|----|--------------------|---|--------|-------------------------|
| DE | 10 2008 043 784 A1 |   | 5/2010 | |
| DE | 10 2009 058 880    | * | 6/2011 | .......... H01M 2/1077 |
| EP | 2 107 633 A1       |   | 10/2009 | |
| JP | 02-123064          | * | 10/1990 | .............. H01M 2/12 |
| JP | 2-123064 U         |   | 10/1990 | |
| WO | 2009/101725 A1     |   | 8/2009 | |

OTHER PUBLICATIONS

International Search Report corresponding to PCT Application No. PCT/EP2011/063672, mailed Oct. 18, 2011 (German and English language document) (7 pages).

* cited by examiner

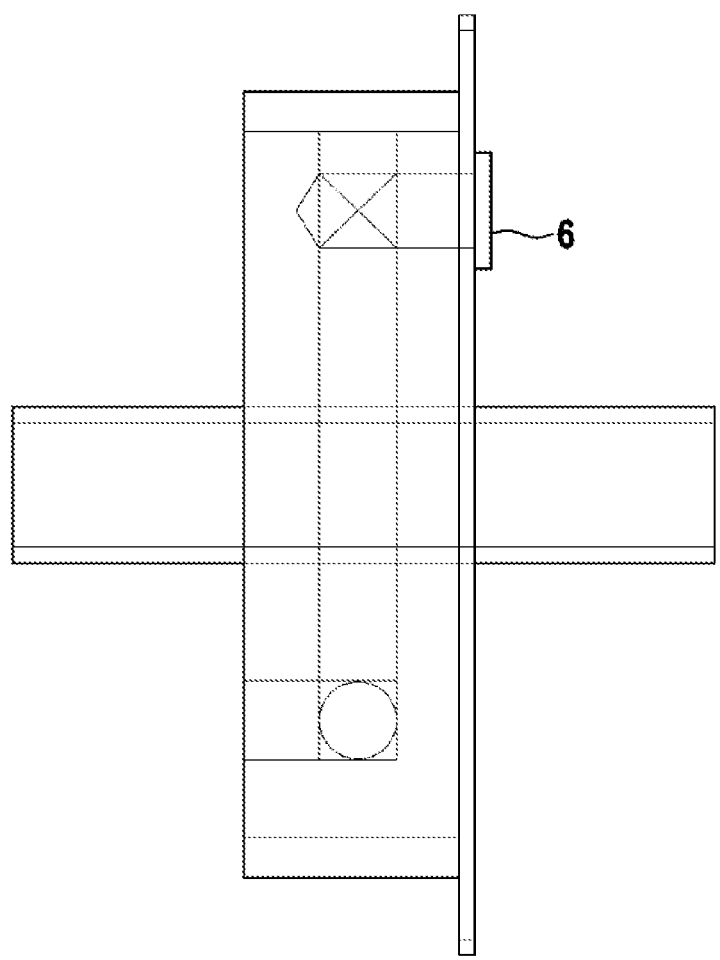

BATTERY HAVING REDUCED CONDENSATE FORMATION DUE TO WATER SEPARATION

This application is a 35 U.S.C. §371 National Stage Application of PCT/EP2011/063672, filed on Aug. 9, 2011, which claims the benefit of priority to Ser. No. DE 10 2010 040 740.2, filed on Sep. 14, 2010 in Germany, the disclosures of which are incorporated herein by reference in their entirety.

The present disclosure relates to a battery having an air drying system for reducing condensate formation inside the battery.

BACKGROUND

A distinctive feature of batteries, in particular high-capacity batteries for automotive use, such as high-capacity lithium-ion batteries, for example, is the considerable amount of heat generated during routine or normal operation. Since batteries can make their optimum capacity available only in a specific temperature range, it is usually necessary to provide an active cooling device, which prevents overheating of the battery.

Here it is often the case that temperatures prevailing inside the battery are lower than the temperature of the ambient air. If ambient air then gets inside the battery, for example through pressure equalization apertures in the battery casing, the moisture contained in this ambient air may condense inside the battery and may cause considerable damage.

In order, for example, to minimize the risk of corrosion, particularly on voltage-carrying components inside the battery, it has been proposed to use systems which extract moisture from the air either inside the battery or before it enters the inside of the battery, thereby preventing a formation of condensate on sensitive components in the battery.

DE 10 2007 011 026 A1 proposes a battery in which a cold trap is provided for condensing and draining moisture out of the casing. However, this cold trap is disclosed as a separate, additional multipart sub-assembly. This means that in producing the battery additional assembly operations are necessary, which prolong the production process and thereby also increase the cost.

SUMMARY

According to the disclosure a battery is provided, which comprises a substantially air-tight casing having an air-permeable aperture for pressure equalization, a plurality of battery cells arranged in the casing and an active cooling device for cooling the battery cells in the casing, wherein the cooling device comprises a coolant and a central distributor block for distributing the coolant, characterized in that an air duct, which is designed and arranged in such a way that the air-permeable aperture in the casing is in contact with the ambient air via the air duct, is integrated in the distributor block.

The battery according to the disclosure is based on the finding that the formation of condensate in a battery can be prevented by cooling the ambient air before it enters the casing, so that any moisture contained therein condenses out beforehand. This function is integrated into an already existing component, through which coolant flows. This has the advantage that when assembling the battery there is no need for a separate air-drying sub-assembly, thereby speeding up the production process and making it more cost-efficient.

The interface between the cooling system of the active cooling device (for example a heat exchanger or some other cooling system already present in the vehicle) and the battery to be cooled is formed by a distributor block, which distributes the coolant for exercising the cooling function over the battery. The distributor block here has an intensive flow of cooled coolant passing through it and therefore represents one of the coldest points of the battery. The casing of the battery is of a substantially air-tight design and allows ambient air to enter the inside of the battery solely via an air-permeable aperture for pressure equalization between the surroundings and the inside of the battery. If the ambient air is ducted through the distributor block before entering the inside of the casing, this air comes into contact with cool surfaces and is cooled. The moisture contained in the ambient air is precipitated as condensate on the contact surfaces in the distributor block and is no longer available to form condensate inside the casing. The air is therefore effectively dried before it enters the battery casing. A formation of condensate inside the casing is thereby reduced or even prevented.

The battery according to the disclosure comprises a plurality of battery cells arranged in a common casing. The battery according to the disclosure here comprises multiple battery cells which are combined into one functional unit. The battery may comprise multiple individual battery cells or one or more battery modules, wherein the modules each comprise a plurality of battery cells, which are suitably connected. For this purpose the individual battery cells of the battery may be conductively interconnected electrically in such a way that these cells are arranged to form the desired battery module or battery architecture.

Here a battery cell is taken to mean an electrochemical energy store, which is capable of storing energy by means of electrochemical processes and supplying this energy again on demand. Battery cells of any accumulator or battery cell type can basically be used in the battery according to the disclosure. The battery preferably comprises battery cells of the lithium-ion cells type, in particular of the Li-ion lithium ions accumulator type, LiPo lithiumpolymer accumulator type, LiFe lithium-metal accumulator type, Li-Mn lithium-manganese accumulator type, LiFePO$_4$ lithium-iron-phosphate accumulator type, or LiTi lithium-titanate accumulator type.

The battery according to the disclosure is preferably a lithium-ion battery, in particular a high-capacity lithium-ion battery, more preferably a battery, for example, a lithium-ion battery, having a nominal capacity of ≥2 Ah, preferably of ≥3 Ah.

The battery according to the disclosure may comprise additional components, for example a battery management system (BMS) for controlling or regulating the performance of the battery.

The battery according to the disclosure comprises a common casing, in which all battery cells or modules of the battery are arranged. Here the term "casing" is taken to mean a device which comprises an interior space, which is suitable for accommodating a plurality of battery cells. The casing preferably separates off the battery cells contained completely from the surroundings in all directions, although the casing may comprise closeable means of access, such as doors or covers, for example. Here the term casing cannot be taken to include the immediate cell container, which directly separates the electrochemical constituents of an individual battery cell from the surroundings. The casing may preferably be made from a material which comprises or is composed of a metal, a sheet metal or a ceramic. The casing can more preferably be made from a material which comprises or is composed of aluminum.

The casing is of substantially air-tight design and comprises one or more air-permeable apertures solely for the purpose of pressure equalization between the battery interior space and the surroundings.

The battery according to the disclosure comprises an active cooling device for cooling the battery. The cooling device comprises a coolant, which as soon as it is cooled down to the required cooling temperature is distributed over the battery via a distributor block in such a way that the battery cells of the battery can be cooled. The coolant is cooled by means of a cooling system, which may be an integral part of the cooling device of the battery according to the disclosure. Alternatively the cooling system for cooling the coolant may be designed as a separate device, which is not an integral part of the battery according to the disclosure, for example as a cooling system or air conditioning system of a motor vehicle. In particular, the coolant of the active cooling device may be a liquid cooling means; the coolant is preferably cooling water.

The nature of the distributor block is such that it is capable of distributing coolant over the battery in order to cool the battery cells, and it therefore constitutes a sub-assembly which is known with regard to this function and is suitable for use in state-of-the-art batteries having an active cooling device.

In addition, an air duct is integrated in the distributor block of the battery according to the disclosure, in order to carry ambient air to the air-permeable aperture in the casing and therefore to allow an equalization of pressure in the battery. For this purpose the air duct is configured and arranged in such a way that the air-permeable aperture in the casing is in contact with the ambient air via the air duct of the distributor block. The air duct may be embodied as a tubular system having air-permeable apertures at the two opposing ends of the air duct, whereas the walls of the tubular system of the air duct are substantially air-impermeable.

The distributor block may comprise an air inlet for the entry of ambient air into the air duct, and an air outlet, which is connected to the air-permeable aperture in the casing in such a way that ambient air can be delivered to the air-permeable aperture via this outlet. Here the air inlet, the air outlet and the air duct arranged and carrying air between them are interconnected and form a functional unit, which ensures that the air-permeable aperture is preferably in contact with the ambient air exclusively via this functional unit. For this purpose the distributor block may be arranged directly on the air-permeable aperture of the casing, for example, so that the air outlet of the distributor block is arranged directly on the air-permeable aperture of the casing and possibly covers this aperture completely.

When ambient air then gets into the distributor block via the air inlet, it is cooled there; moisture contained therein condenses out and is precipitated as condensate on the surfaces of the air duct. In order to ensure that this condensate can be effectively drained from the distributor block, the functional unit comprising the air inlet, the air outlet and the air duct may be arranged in the distributor block in such a way that during routine or normal operation of the battery according to the disclosure a gradient exists from the air outlet as the highest point via the air duct to the air inlet as the lowest point. Here routine or normal operation is taken to mean operation of the battery in an orientation relative to the level in which the battery is routinely used, for example as a vehicle battery. It is therefore ensured that water from the air duct can flow out of the distributor block via the air inlet. This gradient preferably takes the form of a continuous gradient; the gradient is more preferably configured so that it is continuous over the entire length of the air duct. The continuous gradient serves to ensure that no more significant accumulations of water form in the course of the air duct.

In order to prevent condensate from the distributor block getting inside the battery casing, the air outlet of the distributor block may comprise a membrane impervious to water, which substantially prevents the direct passage of liquid condensate from the distributor block into the interior of the casing through the air-permeable aperture in the casing. A microporous membrane, which is air-permeable but impervious to water, is preferably used for this purpose. The membrane impervious to water may be produced from a material, for example, which contains or is composed of polytetrafluoroethylene.

The efficiency of air drying in the distributor block of the battery according to the disclosure can be increased by making the distance that the ambient air has to cover in order to pass from the air inlet to the air outlet as long as possible. The longer the distance that is travelled by the air through the distributor block, the greater the length of time for which the air is exposed to the cool conditions in the distributor block and the more the air is cooled. Since cooler air can carry less moisture, more moisture is also extracted when the air covers a longer distance. The distance covered by the air in the distributor block can be extended, for example, by configuring the air duct so that it has multiple changes of direction and/or turns, for example, instead of forming the shortest possible connection between the air inlet and the air outlet of the distributor block. The air duct is preferably of loop-shaped or meandering configuration. The air duct is more preferably formed in the distributor block in such a way that the air has to cover a distance from the air inlet to the air outlet that is at least twice as long as the shortest distance from the air inlet to the air outlet of the distributor block. The distance may also be at least four or ten times the shortest distance of the air inlet from the air outlet of the distributor block.

For air drying in the distributor block to be as efficient as possible, it is advantageous if, in addition or alternatively to the extension of the distance travelled, the temperature transfer between the cool distributor block and the relatively warmer ambient air ensues as rapidly as possible. This can be achieved, for example, in that the tubing of the air duct is made from a material, the thermal conductivity of which allows a rapid temperature equalization between the distributor block and the air contained in the air duct. The air duct is preferably composed of a material, the thermal conductivity of which is $\lambda \geq 10$ W/(m*K), more preferably $\lambda \geq 50$ W/(m*K), most preferably $\lambda \geq 100$ W/(m*K). Materials containing Al or an alloy thereof are cited as particularly suitable materials.

For air drying in the distributor block to be as efficient as possible, it is furthermore advantageous if, in addition or alternatively to the extension of the distance travelled or the use of materials having a suitable conductivity, the surface which is available for the temperature transfer is as large as possible. This can be achieved, on the one hand, as already mentioned above, by making the distance covered as long as possible. In addition, however, the surface may also be enlarged in that the inner surface of the air duct comprises means for enlarging the surface. Such means may consist, for example, in additionally arranging ribs, grooves, walls, vanes and/or webs the inner surface of the air duct or in the internal cavity of the air duct.

The present disclosure also relates to a distributor block for use in a battery according to the disclosure. Here all the statements made above with regard to the distributor block of the battery according to the disclosure also apply to the distributor block according to the disclosure.

The present disclosure also relates to a motor vehicle, which contains a battery according to the disclosure. What matters here is not that the motor vehicle and the battery form a structural unit, but that the motor vehicle and the battery according to the disclosure are functionally in contact, in such a way that the battery can fulfill its function during operation of the motor vehicle. Here the term "motor vehicle" is taken to mean all powered vehicles which comprise a battery for supplying energy to at least one component of the motor vehicle, irrespective of what form of propulsion these motor vehicles have. In particular, the term "motor vehicle" encompasses hybrid electric vehicles (HEV), plug-in hybrid vehicles (PHEV), electric vehicles (EV), fuel cell vehicles, and all vehicles which use a battery for at least partially supplying them with electrical energy.

BRIEF DESCRIPTION OF THE DRAWINGS

Exemplary embodiments of the disclosure are explained in more detail with reference to the drawings and to the following description. In the drawings:

FIG. 2 shows a perspective representation of a distributor block of a battery according to the disclosure from the side, revealing internal components.

DETAILED DESCRIPTION

Figure 1:
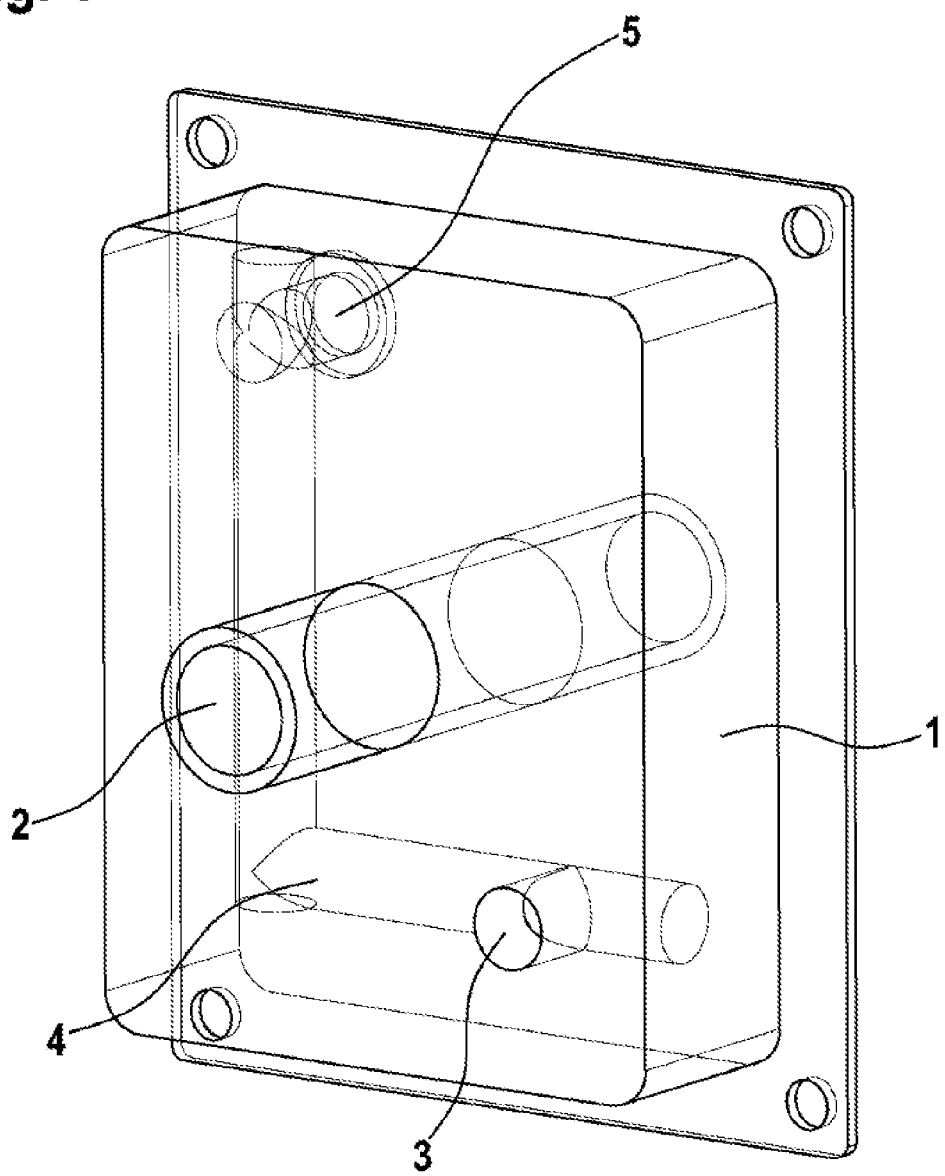
FIG. 1 shows a perspective representation of a distributor block of a battery according to the disclosure obliquely from above, revealing internal components.

FIG. 1 shows a distributor block of a battery according to the invention in a perspective view obliquely from above. Selected internal components are revealed. The distributor block 1 comprises a connection 2 for the coolant, via which the battery is supplied with coolant. In addition, on the side remote from the battery casing the distributor block 1 comprises an air inlet 3. On the side facing the battery casing the distributor block comprises an air outlet 5, which after fitting the distributor block 1 to the battery casing comes to lie on an air-permeable aperture in the battery casing. An air duct 4, which forms a functional unit together with the air inlet 3 and the air outlet 5, is provided between the air inlet 3 and the air outlet 5. Ambient air can be delivered to the air-permeable aperture in the battery casing via this functional unit. The battery according to the invention is preferably designed in such a way that the battery interior space is in contact with the ambient air exclusively via this functional unit. Here the air outlet 5 is situated higher than the air inlet 3, and the air duct 4 is formed with a continuous (uninterrupted) gradient between the air outlet 5 as the highest point and the air inlet 3 as the lowest point. This serves to ensure that liquid condensate precipitated in the air duct 4 of the distributor block 1 flows in the direction of the air inlet 3 and via this can be drained out of the distributor block 1. As represented in FIG. 2, the air outlet 5 may comprise a membrane impervious to water 6, which prevents liquid condensate passing out of the distributor block 1 in the direction of the battery interior space.

The invention claimed is:

1. A battery, comprising:
   a substantially air-tight casing defining a single, air-permeable aperture that opens into an interior space of the casing, the air-permeable aperture configured to bi-directionally equalize an air pressure within the interior space;
   a plurality of battery cells arranged in the interior space of the casing; and
   an active cooling device configured to cool the battery cells in the interior space of the casing, the cooling device including a coolant and a distributor block,
   wherein the distributor block defines (i) a coolant duct configured to distribute the coolant and (ii) an air duct configured and arranged to place the air-permeable aperture in contact with ambient air via the air duct, the ambient air disposed about an exterior space of the casing and the distributor block, and
   wherein the air duct has an air inlet at one end and an air outlet at the other end, the air duct connected to the air-permeable aperture at the air outlet, the air inlet opening to the ambient air.

2. The battery as claimed in claim 1, wherein the air outlet of the distributor block is arranged directly on the air-permeable aperture in the casing.

3. The battery as claimed in claim 1, wherein the air inlet, the air outlet and the air duct are arranged in the distributor block and configured such that, in normal operation of the battery, a height gradient exists along the air duct from the air outlet towards the air inlet, the air outlet positioned higher vertically than the air inlet.

4. The battery as claimed in claim 3, wherein the height gradient along the air duct is continuous from the air outlet toward the air inlet.

5. The battery as claimed in claim 1, wherein the air duct in the distributor block is configured such that air has to cover a distance from the air inlet to the air outlet which is at least twice as long as a shortest distance of the air inlet from the air outlet.

6. The battery as claimed in claim 1, wherein the air duct includes a plurality of turns and has one of a loop-shaped configuration and a meandering configuration.

7. The battery as claimed in claim 1, wherein the air duct is composed of a material having a thermal conductivity equal to or greater than 10 W/(m*K).

8. The battery as claimed in claim 1, wherein the air duct is composed of a material which contains one of aluminum and an aluminum alloy.

9. The battery as claimed in claim 1, wherein an inner surface of the air duct includes a feature configured to enlarge the inner surface, the feature being at least one of ribs, grooves, walls, vanes and webs.

10. The battery as claimed in claim 1, wherein the air outlet includes a water impervious membrane configured to substantially prevent passage of liquid water from the distributor block into an interior of the casing through the air-permeable aperture in the casing.

11. The battery as claimed in claim 1, wherein the coolant of the active cooling device is a liquid coolant.

12. A distributor block for use with a battery having a substantially air-tight casing that defines a single, air-permeable aperture, the air-permeable aperture opening into an interior space of the casing and being configured to bi-directionally equalize an air pressure within the interior space, the distributor block comprising:
   a coolant duct defined by the distributor block and configured to distribute a coolant; and an air duct defined by the distributor block and configured and arranged to place the air-permeable aperture in contact with ambient air disposed about an exterior space of the casing and the distributor block, the air duct having an air inlet at one end and an air outlet at the other end, the air duct connected to the air-permeable aperture at the air outlet, the air inlet opening to the ambient air.

13. A motor vehicle, comprising:
a battery including:
   a substantially air-tight casing defining a single, air-permeable aperture that opens into an interior space of the casing, the air-permeable aperture configured to bi-directionally equalize an air pressure within the interior space;
   a plurality of battery cells arranged in the interior space of the casing; and
   an active cooling device configured to cool the battery cells in the interior space of the casing, the cooling device including a coolant and a distributor block,
   wherein the distributor block defines (i) a coolant duct configured to distribute the coolant and (ii) an air duct configured and arranged to place the air-permeable aperture in contact with ambient air via the air duct, the ambient air disposed about an exterior space of the casing and the distributor block, and
   wherein the air duct has an air inlet at one end and an air outlet at the other end, the air duct connected to the air-permeable aperture at the air outlet, the air inlet opening To the ambient air.

* * * * *